Patented Jan. 23, 1934

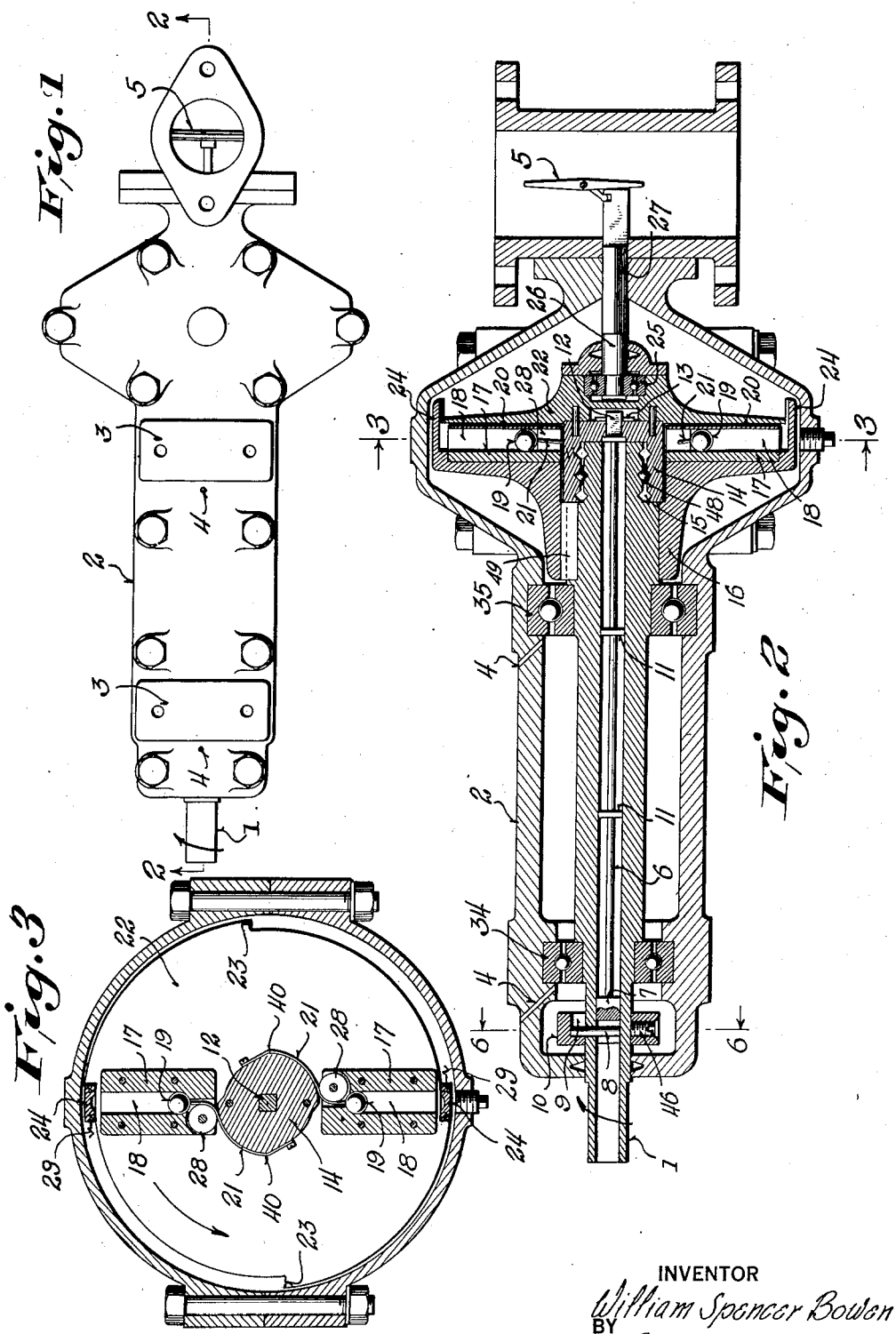

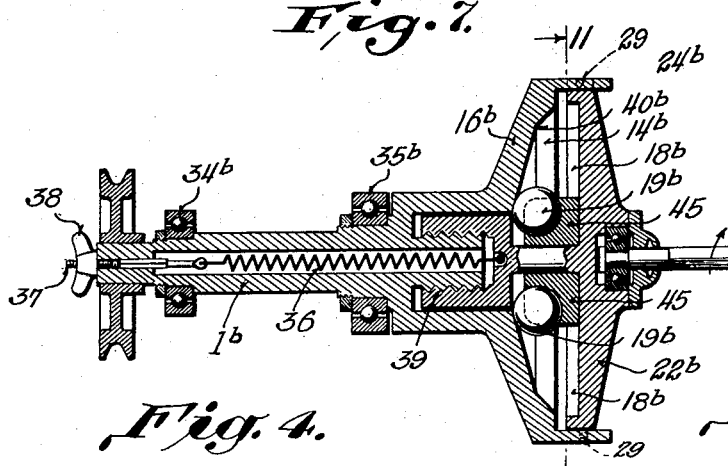
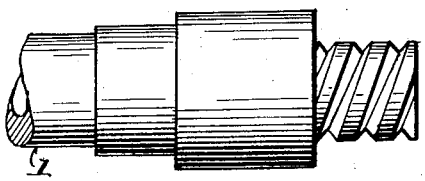
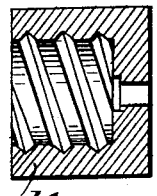
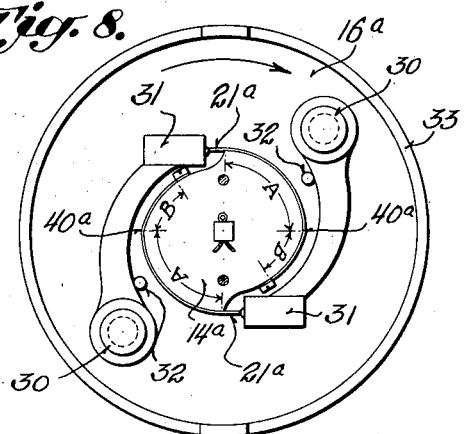
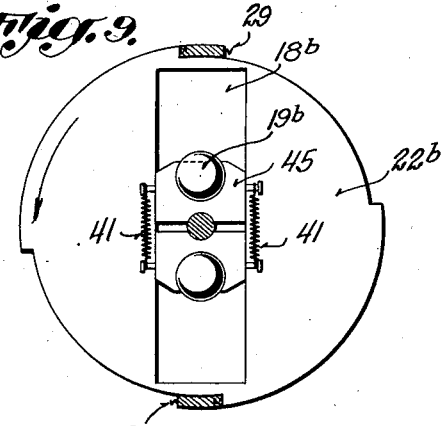
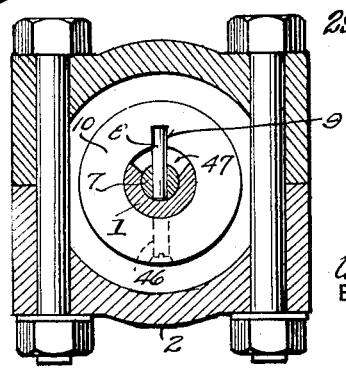

1,944,210

UNITED STATES PATENT OFFICE 1,944,210

GOVERNOR

William Spencer Bowen, Westfield, N. J.

Application March 17, 1931. Serial No. 523,262

2 Claims. (Cl. 264—17)

This invention relates to improvements in inertia governors, and has for its main object the provision of a governor of this character which will be an improvement of the inertia governor described and claimed in Patent No. 1,645,088, granted to me on October 11, 1927.

The device of this invention is a departure from the invention in my Patent No. 1,645,088. I have used a torsion spring in the form of either a bar spring or coiled spring, the aforesaid being located axially within and connected to the shaft at one end and the said spring being secured to a cam and inertia disc at its other end. At the point where the spring is connected to the shaft means are provided so that its tension can be adjusted to control the desired speed of operation. The cam is designed with a relatively sharp or sudden balancing point, a novel and very useful means and a feature lacking in my previous invention in which the curvature of the cam varied gradually. The cam has a rotary motion imparted to it through the bar spring which is attached to the cam and the driven hollow shaft. Members connected to heavy centrifugal masses which are caused to rotate with the hollow shaft are arranged to exert a torque upon the cam and the inertia member or disc. This torque causes a relative motion between the cam and the hollow shaft distorting the spring and also causing transverse axial motion between the two through suitable means, such as a male and female thread or a pin or pins operating in a groove or grooves. As in my Patent No. 1,645,088, an inertia member is fastened to the cam or threaded portion so that during acceleration a couple is applied to the cam which also causes it to move with respect to the hollow shaft, as described above. A following control linkage is made coacting with the inertia disc.

In a modification or alternative form of my new device the spring is axial, as before, but the cam instead of being of the plate type is in the form of a dish-shaped surface of revolution and instead of being secured to the inertia member is secured to the hollow shaft. Resting on this cam are two opposed centrifugal masses in the form of bearing balls. These balls are slidably mounted with respect to an inertia disk so that they may move readily with respect thereto and are urged toward the center of said disk by resilient means. These balls are properly mounted so as to fly out toward the periphery upon an increase in speed. Integrally associated with said inertia disk and coaxial therewith is an internally threaded cylindrical member. The cam is so cut that as the masses fly out they follow the dish-shaped surface of the cam, which surface has an annular zone in which an abrupt increase of concavity occurs. The inertia member, which on one side is fastened to the axial spring and on the other to a following control linkage, is also fastened loosely to the main shaft by the internally threaded member engaging a threaded portion of said shaft so that as it moves under the urge of the centrifugal masses, which co-act therewith to exert a thrust, it also moves axially. The balancing point previously referred to is indicated on the dish-shaped cam by an abrupt change in concavity of the surface of revolution above referred to.

These novel constructions of my new inertia governor produce novel results which I believe have never been produced before by any other governor, including the inertia governor described and claimed in my Patent No. 1,645,088, as follows: Speed regulation within a range one-tenth of that formerly possible is obtained; magnified sensitivity is obtained; great simplification of installation; great reduction in cost of manufacture; and great increase in life.

In the drawings:

Fig. 1 is a plan view of one embodiment of my governor;

Fig. 2 is a longitudinal section 2—2 of Fig. 1;

Fig. 3 is a cross-section view taken at 3—3 of Fig. 2 and looking toward the right;

Fig. 4 is a detail of the end of the main shaft shown in Fig. 2;

Fig. 5 is a detail in section of the portion surrounding the main shaft shown in Fig. 2;

Fig. 6 is a detail of the locking device at section 6—6 of Fig. 2;

Fig. 7 is a section of a form of my governor which employs another form of cam;

Fig. 8 is a view of another form of centrifugal weights which may be used in the governor shown in Fig. 2, the same being shown as it would appear if adapted to the governor of Fig. 2 and viewed from a position to the right of Fig. 2;

Fig. 9 is a cross-section taken at 11—11 of Fig. 9.

A form of my invention best known to me is shown in Figs. 1 to 6, inclusive. In Fig. 1 the numeral 1 designates the shaft through which the motion of the rotating mechanism is transferred to the governor, 2 the casing of the governor, 3 the pads for attachment of the governor to any machine, 4 the oil holes to the two ball-bearings, 5 a butterfly valve for attachment between a carburetter and inlet manifold of a gas engine.

In Fig. 2 motion from the rotating mechanism is transmitted to the governor through the shaft 1, mounted on bearings 34 and 35. Centrally located in this shaft is a torsional spring 6, fastened at one end to the shaft 1 by means of a slotted boss 7 fastened firmly to the spring 6 through which passes a pin 8. This pin may be adjustably fixed rotationally but not axially in the shaft 1. At its outer end this pin is held by means of a slot 9 in a locking ring 10. The locking ring 10 is held in place with set-screw 46. Thus, by this locking ring turning about the shaft the spring 6 can be given an initial twist, of varying degrees of strength, thus predetermining the speed at which the spring will balance the centrifugal masses 19. In Fig. 6 is shown a detail of this locking device in which 47 is a sector cut in shaft 1. The spring 6 is supported throughout its length by means of spacer members 11. The other end of the spring 6 is fastened by means of a boss 12 and cotter pin 13 to a cam 14. Cam 14 is loosely fastened to the shaft 1 by means, in Fig. 2, of a ball-bearing screw 15, the balls thereof being maintained in spaced relation by a race 48 so as to confine the cam to a helical movement with respect to shaft 1.

Figs. 4 and 5 show details of the end of shaft 1 and inside of cam 14 which with the ball-race 48 form the screw 15. The thread 15, as shown in Figs. 4 and 5, is a right hand thread so that movement of the cam 14 clockwise with respect to shaft 1, when looking toward the right, causes said cam to unscrew from the shaft 1 and to move bodily toward the right. When the opposite relative motion takes place the cam 14 is drawn on to the shaft 1. As more fully explained hereinafter, this motion of the cam 14 back and forth on shaft 1 is availed of to operate the valve 5. The cause of relative movement between the shaft 1 and cam 14 is two-fold, one cause being the giving up or receiving of kinetic energy by the inertia member 22 and the other the action of centrifugal members 19 on the cam 14. To shaft 1, Fig. 2, is fastened firmly a flange 16 to which is attached cages 17 in which there are radial grooves 18 containing centrifugal masses, balls 19 in this instance, which are held in place by the cover plates 20. These masses 19 are attached to the cam 14 by means of the flexible connecting means 21 passing around an idler pulley 28 so that as the governor speeds up in a counter-clockwise direction as viewed from the driven end and the masses fly out a torque is applied to the cam, both rotating it and advancing it axially to the right by virtue of the right hand screw. The helical movement thus imparted to the cam 14 causes the flexible members 21 to wrap themselves about the cam 14 in a helical form. Cam 14 has sharp balancing points 40 on its periphery. An inertia member or disc 22 is fixed to the end of the cam 14. This disc is fitted with stops or segments of reduced radius 23, see Fig. 3. These engage lugs 24 of the flange 16 so as to limit the relative angular motion of the inertia member 22 and main drive-shaft 1 to a definite arc. On the reverse side of the inertia disc 22 is mounted a ball-bearing 25. This bearing supports a thrust rod 26 held to only axial motion by means of a square portion 27. This thrust rod 26 operates the butterfly valve 5 whenever centrifugal force or a lagging or leading of the inertia member causes relative clockwise movement between cam 14 and shaft 1. Since thread 15 is a right hand thread the push-rod 27 will move to the right and start to shut the valve 5 by rotating it counter-clockwise whenever acceleration is taking place, the main shaft, of course, being rotated counter-clockwise, as viewed from the left end of Figs. 1 and 2. At 29 (Fig. 3) is indicated short stub springs to protect the lugs 24 from the impact of the inertia member stops 23.

The centrifugal masses 21 may be replaced by other means. For example, in Fig. 10 are shown pivotally mounted centrifugal masses instead of slidably mounted masses. This figure shows in full the right side of a member 16ª which may be keyed to shaft 1 by key 49. The member 16ª and its pivotally attached centrifugal members replaces the flange 16 and its attached cages 18 and balls 19. The remainder of the device is identical with that shown in Fig. 3 and the mode of operation is the same. The flange 16—a has a rim 33 which acts as an outer stop for the centrifugal masses and a pin 32 is fixed to flange 16—a as an inner stop. The centrifugal masses 31 are mounted on ball-bearings 30 and are attached to the cam 14—a by means of springs 21—a. The cam 14—a is cut in the sections A with a constant radius. At 40—a or the balancing point the radius suddenly begins to diminish through the sections B, thus reducing suddenly the effective torque of the centrifugal masses 31.

In another modified form shown in Figs. 9 and 11, through the shaft 1—b there is an eye-bolt 37 and thumbscrew 38. To the eye-bolt 37 is attached an helical tension spring 36 passing axially through the shaft to the threaded portion 39 of the inertia member 22—b to which it is fastened firmly. This threaded portion has a pitch of thread such that tension on the spring 36 will draw the threaded portion 39 axially along the shaft 1—b. When the rotation is as shown in the drawings the thread 39 is a right hand thread. To the shaft 1—b is fastened the flange 16—b fitted with stops 24—b and stop springs 29—b, see Fig. 11. The inner face of this flange is cut in the form of the dish-shaped cam 14—b with a balancing point 40—b. Centrifugal masses 19—b, consisting in this case of bearing-balls, are mounted in sliding members 45 so that with increase in speed the sliding members 45 and centrifugal masses 19—b slide out radially in grooves 18—b cut on the inner face of the inertia member 22—b and roll out radially on the face of the cam 14—b. The cam 14—b is so cut that as the masses 19—b advance radially they exert a thrust against cam 14—b which advances the threaded portion 39 both axially and rotatively until the masses 19—b come to the balancing point 40 where the curvature of the cam increases suddenly. This sudden increase of axial movement reduces the effective torque upon the threaded portion and consequently throws the spring 36 and centrifugal masses 19—b into balance at the point 40. The inertia mass 22—b operates to hold this balance. The springs 41 attached to each side of the centrifugal masses 19—b insure the travel of the masses back into their central position upon slowing down of the governor.

In each of the described forms of this invention there is a cam in some portion of whose surface there is a discontinuity or abrupt change of surface. In each of the described forms a resilient means is placed so that its main body lies close to the center of rotation of the governor. By so placing the resilient means secondary dynamic effects, such as distortion of the resilient means through centrifugal force acting upon the means itself, is minimized or practically eliminated.

The governor of this invention performs its function in a manner different from any other governor. The governor shown in Fig. 2 represents a form of my invention when at rest. In bringing the governed machine from rest to operating speed the governor goes through the following adjustments: As the machine and consequently the governor accelerates the inertia means imposes a couple proportional to the acceleration, which causes the following control means to somewhat constrict the supply of energizing fluid. At the same time the centrifugal means imposes a constantly increasing couple which adds to the previously mentioned couple and which likewise causes the following control means to increasingly restrict the supply of energizing fluid to the machine. Eventually further acceleration is prohibited by the constriction of the supply of energizing fluid. As this state approaches, the couple imposed by the inertia means decreases and when the said state is reached the inertia couple vanishes because the acceleration has become equal to zero. In this condition the centrifugal masses assume a fixed position with respect to the drive shaft and settle into a steady state of motion. The machine is now traveling at constant governed speed and the absolute value for this speed is determined wholly by the properties of the centrifugal system as a separate entity exclusive of the inertial system of the governor. This being the case the centrifugal system can be so designed that the connecting means between the centrifugal weights and the cam drum depart from the cam drum for a given speed of rotation at a definite point on the curvature thereof. In the invention this definite point of departure is located directly at a sharp break in curvature of the cam drum. Such design renders the centrifugal system of the governor extremely sensitive to variations in speed.

What I claim as my invention is:

1. In a governor, the combination of a rotatable shaft, an oscillatable member having threaded engagement with said shaft and rotatable thereon, a governor spring consisting of torque transmitting resilient means mounted to extend along the axis of said shaft for transmitting torque from said shaft to said oscillatable member, and means including centrifugal members for effecting an axial movement of said oscillatable member relative to said shaft.

2. In a governor, the combination of a rotatable hollow shaft, an oscillatable member having threaded engagement with said shaft and rotatable thereon, a cam with sudden changes of curvature affixed to said oscillatable member, a torsion spring extending along the axis of said shaft connecting said shaft with said oscillatable member, and pivoted hammer-shaped centrifugal members operatively connected by flexible members to said cam to apply a couple thereto and cause axial movement thereof when said shaft is rotated.

WILLIAM SPENCER BOWEN.